Patented May 12, 1964

3,132,994
POLYMYXIN PURIFICATION

Walter Mark Duffin and Raymond Weddle, London, England, assignors to Burroughs Wellcome & Co. (U.S.A.) Inc., Tuckahoe, N.Y., a corporation of New York
No Drawing. Filed Feb. 19, 1962, Ser. No. 174,305
Claims priority, application Great Britain Mar. 10, 1961
4 Claims. (Cl. 167—65)

This invention relates to novel antibiotics, in particular to polymyxins, and their purification.

The polymyxins are a family of polypeptide antibiotics having antibacterial activity and are most effective against Gram-negative bacteria. They may be obtained from the products of fermentation of various special media by strains of *Bacillus polymyxa*. Polymyxins A, B, C, D and E are known, of which polymyxins B and E are preferred for medicinal use because of their low toxicity. In this specification, the antibiotic described as colistin or colimycin, said to be produced by *Bacillus colistinus*, is regarded for all purposes as a polymyxin; it is believed to be a form of polymyxin E.

The polymyxin polypeptides are basic substances and are conveniently isolated and used in the form of addition salts with acids. Their N-methanesulphonate derivatives, formed by treatment with formaldehyde and a bisulphite, may also be used, and have the advantage of reduced local toxicity on injection, particularly by the intramuscular route.

A crude polymyxin obtained from the fermentation medium, generally discolored by organic matter from the medium, has hitherto been purified by a number of precipitation or crystallization steps with organic acids. These steps are inconvenient and may be associated with a substantial loss of the active material. It has been found that the number of such steps can be reduced by introducing into the purification process the step of treating the impure polymyxin in aqueous solution with a permanganate. This new step is especially effective in improving the appearance of a discolored polymyxin. The polymyxin is preferably used in concentrated solution, conveniently about 10% w./v. The permanganate, conveniently potassium permanganate, may be used in neutral solution, but is preferably used in the presence of a mineral acid such as sulphuric acid. The purification preferably takes place within a pH range of from about pH 3.0 to about pH 7.5. Sodium permanganate may likewise be employed. It is desirable to avoid the use of a substantial excess of acid over that required by the equation:

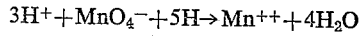

$$3H^+ + MnO_4^- + 5H \rightarrow Mn^{++} + 4H_2O$$

where 5H represents oxidizable hydrogen in the impurities of the polymyxin, so that on completion of the oxidation the polymyxin solution is not far from its initial pH. The permanganate solution is preferably added gradually to the polymyxin solution, and the presence of a slight excess is apparent from a persistent pink color. Any excess of permanganate can be destroyed in known manner, conveniently by the addition of hydrogen peroxide. At all stages, it is desirable to prevent the polymyxin solution becoming substantially alkaline, and in any case not above pH 8.0.

The polymyxin is obtained from this purification process as an aqueous solution that contains manganese cations and the cations of the permanganate salt used, and may also contain other inorganic cations present in the impure polymyxin used as the starting material. The polymyxin may be separated from these cations in known manner, for example by precipitation. Conveniently, the separation is carried out by passing the solution through a cation-exchange material possessing strongly acidic groups present in the free acid form and showing a substantial degree of cross-linking throughout the material. A sulphonated polystyrene resin prepared with a relatively high proportion (such as about 20%) of divinylbenzene is a suitable material. Such a material absorbs the cations of small molecular weight but does not absorb the polymyxin if the degree of cross-linkage is sufficiently high. Polymyxin, free from manganese and other cations of low molecular weight, is thus obtained in acid solution in the effluent. From this solution the free base or a desired salt or derivative may be prepared.

Because of their medicinal utility, the new process is especially important for the purification of polymyxins B and E. The product directly obtained may be converted, if necessary after further purification, into such a therapeutically acceptable form as polymyxin B sulphate or sodium polymyxin B N-methanesulphonate, or polymyxin E sulphate or sodium polymyxin E N-methanesulphonate.

This invention in one aspect therefore provides a process for increasing the purity of an impure polymyxin comprising the step of treating the polymyxin in aqueous solution under acid or about neutral conditions with a permanganate. Preferably the polymyxin is then separated from manganese cations.

This invention provides in particular a process for increasing the purity of an impure polymyxin comprising the successive steps of treating the polymyxin in aqueous solution under acid or about neutral conditions with a permanganate, and passing the solution of polymyxin thus obtained through a cation-exchange material possessing strongly acidic groups in the free acid form and showing a substantial degree of cross-linking throughout the material, whereby cations of low molecular weight including manganese cations are absorbed by the material and the polymyxin remains substantially unabsorbed.

This invention in another aspect provides a polymyxin, whether as the free base, as an addition salt with an acid, or as an N-methanesulphonate derivative, the polypeptide molecule of which has undergone purification at some stage by treatment with a permanganate as described in either of the preceding two paragraphs.

The following examples illustrate the invention.

Example 1

0.5 g. crude polymyxin B hydrochloride was dissolved in 10 ml. water to give a deep brown solution. 1% w./v. aqueous neutral potassium permanganate was added dropwise until the pink color remained for one minute. The solution was then decolorized to a straw color with sulphur dioxide and the precipitated manganese oxide was removed.

0.5 g. crude polymyxin B sulphate, similarly obtained, was treated with potassium permanganate in the way described above. There was no loss of biological activity.

1.6 g. crude polymyxin A sulphate was similarly treated with potassium permanganate. The product was purified by precipitation with a mixture of sodium salts of sulphated fatty alcohols and then converted to sulphate. Full biological activity was retained.

Example 2

1.0 kg. crude polymyxin B sulphate containing about 60% inorganic material, obtained from fermentation broth, was extracted with 10 litres water, and insoluble material filtered off. The clear solution was treated gradually with a solution containing 25 g. potassium permanganate per litre and 0.475 N with respect to sulphuric acid. The treatment was continued until a pink color remained for five minutes on standing; about one litre of the acidified permanganate solution was required. 30% w./v. hydrogen peroxide solution was added until the color was discharged; about 20 ml. was required. The mixture was allowed to stand for 30 minutes. Filtration may be desirable at this stage; some dissolved oxygen is thereby removed as well as insoluble material.

The polymyxin B was recovered by the following procedure. The reaction mixture was allowed to flow by gravity at the rate of 50 ml./min. through a vertical glass tube 10 cm. in diameter and 46 cm. high containing 4.5 kg. of a sulphonated polystyrene cation-exchange resin sold by the Permutit Company Limited as "Zeocarb 225." The acidic effluent was brought to pH 7 by the slow addition of 34.5% ammonia or by passage through an anion-exchange resin. The neutral solution was concentrated in a cyclic still to a volume of 5 litres. Polymyxin B base was precipitated by adding 2.5 litres 34.5% ammonia and allowing to stand for 4 hours. The product was collected, washed with water until free from ammonia, and vacuum-dried at a low temperature to give 150 g. polymyxin B base, suitable for further purification by fractional crystallization as the naphthalene-2-sulphonate.

Crude polymyxin E sulphate may be treated similarly.

What we claim is:

1. A process for the purification of a polymyxin antibiotic which comprises contacting an aqueous solution of the polymyxin with a permanganate selected from the class consisting of potassium and sodium permanganate within the pH range of from about pH 3.0 to about pH 7.5, and passing the solution of the polymyxin thus obtained through a cation-exchange material possessing strongly acidic groups in the free acid form to obtain the polymyxin in acid solution in the effluent.

2. A process as set forth in claim 1 wherein the polymyxin treated is polymyxin B.

3. A process as set forth in claim 1 wherein the polymyxin treated is polymyxin E.

4. A process as set forth in claim 1 wherein the purification reagent is 1% w./v. aqueous neutral potassium permanganate.

References Cited in the file of this patent
UNITED STATES PATENTS

| | | |
|---|---|---|
| 2,565,057 | Clough | Aug. 21, 1951 |
| 2,671,104 | Benedict | Oct. 16, 1951 |